United States Patent

Puzo et al.

[11] Patent Number: 6,013,957
[45] Date of Patent: Jan. 11, 2000

[54] ARRANGEMENT FOR REDUCING THE ELECTROMAGNETIC FIELD CREATED BY POWER ELECTRONIC EQUIPMENT

[75] Inventors: Antoine Puzo, Versailles; Juan Gonzalez, St-Arnoult En Yvelines, both of France

[73] Assignee: Alcatel, Paris, France

[21] Appl. No.: 08/793,302

[22] PCT Filed: Mar. 21, 1996

[86] PCT No.: PCT/FR95/01163

§ 371 Date: Mar. 12, 1997

§ 102(e) Date: Mar. 12, 1997

[87] PCT Pub. No.: WO96/08863

PCT Pub. Date: Mar. 21, 1996

[30] Foreign Application Priority Data

Sep. 13, 1994 [FR] France .................. 94 10904

[51] Int. Cl.⁷ ...................................... H05K 9/00
[52] U.S. Cl. ................. 307/91; 307/89; 332/12; 361/143
[58] Field of Search .................. 307/89, 90, 91; 333/12; 361/107, 143, 146; 174/32, 35 R; 343/842; 439/916

[56] References Cited

U.S. PATENT DOCUMENTS

| 1,896,819 | 2/1933 | Hyde | 307/91 |
| 4,187,447 | 2/1980 | Stout et al. | 315/85 |
| 5,541,609 | 7/1996 | Stutzman et al. | 343/702 |
| 5,598,079 | 1/1997 | Robert | 318/780 |

FOREIGN PATENT DOCUMENTS

| 3835751A1 | 4/1990 | Germany . |
| 5145266 | 6/1993 | Japan . |

*Primary Examiner*—Albert W. Paladini
*Attorney, Agent, or Firm*—Sughrue, Mion, Zinn, Macpeak & Seas, PLLC

[57] ABSTRACT

The arrangements essentially comprise an antenna element placed in the vicinity of a radiating conductor of the equipment in such a manner as to absorb the electromagnetic energy reaching it by coupling with the radiating conductor.

4 Claims, 3 Drawing Sheets

ARRANGEMENT FOR REDUCING THE ELECTROMAGNETIC FIELD CREATED BY POWER ELECTRONIC EQUIPMENT

The present invention relates to arrangements for reducing the electromagnetic field emitted by electronic power equipment.

One such item of electronic power equipment, an AC to DC converter, for example, comprises electronic switches generating an electromagnetic field which, because of the powers involved, is very intense and requires arrangements for reducing propagation thereof outside the equipment. In this respect, known solutions rely on shielding and filtering.

When such solutions are applied to equipment of relatively low power and small volume, they are effective for reasonable cost. Nevertheless, with the increase in power of electronic power equipment, and thus with the increasing volume thereof, such arrangements are becoming unacceptable, not only in terms of cost, but also in terms of volume and of weight, while the increase in switching speeds further increass the levels of emitted radiation.

An object of the present invention is thus to provide arrangements seeking to reduce the electromagnetic field emitted by electronic power equipment effectively and at low cost, with a corresponding reduction in requirements concerning filtering and shielding when they remain necessary.

The arrangements of the invention seeking to reduce the electromagnetic field emitted by electronic power equipment essentially comprise an antenna element placed in the vicinity of a radiating conductor of the equipment so as to absorb the electromagnetic energy reaching it by coupling with the radiating conductor, thereby reducing the energy that is radiated into the space surrounding both of them.

In one embodiment, when the radiating conductor is a monopole (radiating a field that is essentially electric), the antenna element is also a monopole constituted by a conductor of the same length and the same shape as the radiating conductor, and connected to ground at one of its ends.

In another embodiment, when the radiating conductor is a loop (radiating a field that is essentially magnetic), the antenna element is also a loop formed by a conductor having the same path, length, and area as the radiating conductor.

The various objects and characteristics of the invention appear more clearly in the light of the following description of an embodiment of the invention, given with reference to the accompanying figures, in which.

The present invention is applied to reducing the electromagnetic field emitted by electronic power equipment.

Figure 1:
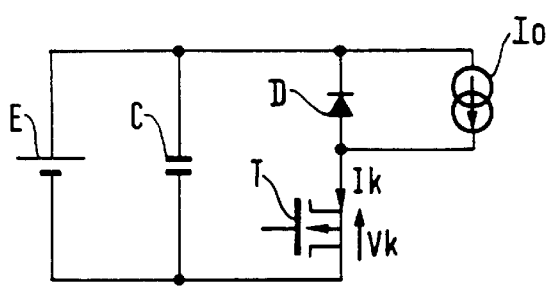
FIG. 1 is a circuit diagram by way of example of a DC chopper that can be used in electronic power equipment.

An example of such electronic power equipment is an AC to DC converter, including electronic switches that generate an electromagnetic field. One example of such an electronic switch is shown in FIG. 1. This figure is a schematic of a DC chopper comprising a DC source E (e.g. a rectifier), a filter capacitor C, a switching transistor T, a free-wheel diode D, and a load represented by a current generator Io.

Figure 2:
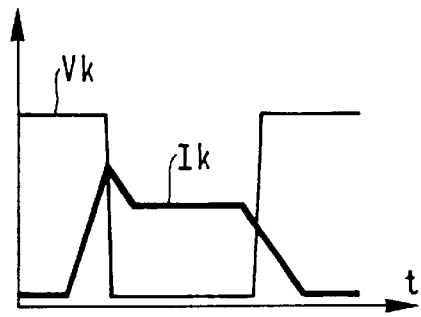
FIG. 2 shows the voltage and the current in the switching transistor T of the FIG. 1 circuit.

FIG. 2 is a diagram showing the voltage Vk across the terminals of the switching transistor T and the current Ik flowing through it during each period that the switching transistor T is ON and is OFF. It can be seen that the voltage Vk across the terminals drops suddenly to zero while the current Io in the load is established. After the ON period of the switching transistor T, the current through the transistor falls to zero, while the voltage rises to a value Vk close to the voltage of the source E. Also, but not visible in the figure, the current through the load Io is maintained via the free-wheel diode D.

Each time the voltage of the current in the circuit of FIG. 1 changes suddenly, damped oscillation is produced in conventional manner in some of the conductors, thereby giving rise to electromagnetic emission. The object of the invention is to reduce it.

Figure 3:
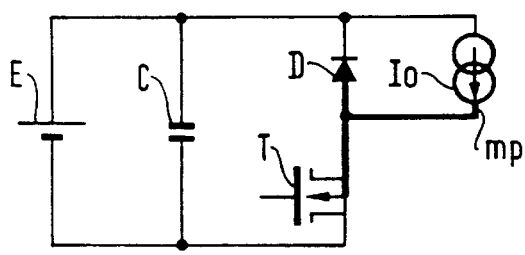
FIG. 3 shows the same circuit of FIG. 1, but it also indicates the monopoles that generate an electric field.

FIG. 3 shows the same circuit as FIG. 1, in which the conductor mp connecting the collector of the transistor T to the diode D and to the load Io is drawn bold, to illustrate the fact that this conductor mp, which is subjected to a sudden change in voltage when the switching transistor T switches OFF, behaves like a monopole and emits radiation, essentially of electric field which propagates in all directions in space (in the physical embodiment, of course, not on the drawing). The other conductors of the circuit can be ignored in this respect since they are all grounded, whether being connected to ground directly or via the voltage source E or the capacitor C which act as short circuits in this respect.

Figure 4:
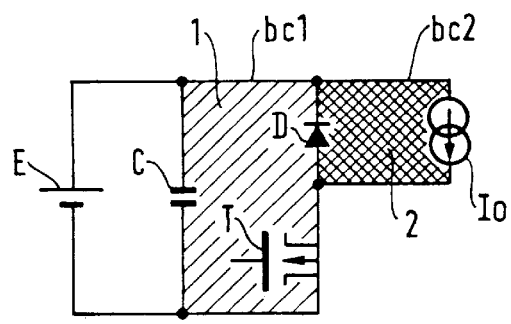
FIG. 4 is the same circuit again, but with indications showing the loops that generate a magnetic field.

In similar manner, FIG. 4 shows the same circuit in which single shading shows one of two loops bc1 and cross-hatching shows the other of two loops bc2 around which oscillating currents flow when the switching transistor T is in operation, thereby giving rise to essentially magnetic field emissions that propagate in the space around the loops.

Figure 5:
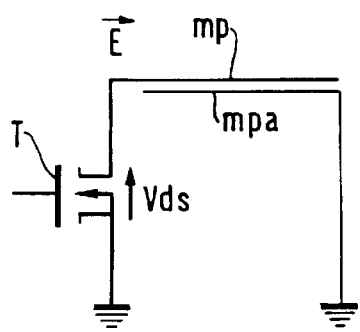
FIG. 5 is an illustration of arrangements in a first embodiment of the invention for reducing the electromagnetic field emitted by a radiating monopole.

FIG. 5 reproduces solely the switching transistor T of the above figures together with a section of conductor operating as a radiating monopole mp, together with the arrangements mpa provided by the invention for reducing the electromagnetic field emitted by the monopole.

Figure 6:
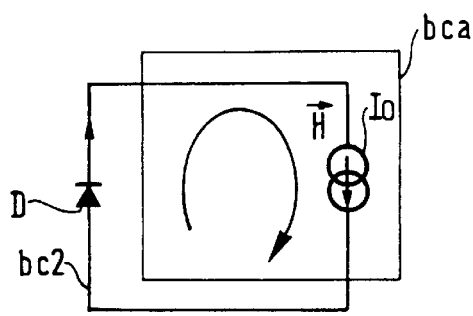
FIG. 6 is an illustration of a second embodiment of arrangements of the invention for reducing the electromagnetic field emitted by a radiating loop.

FIG. 6 shows, in analogous manner, only the free-wheel diode D and the load Io in radiating loop bc2, together with the arrangements bca provided by the invention for reducing the electromagnetic field emitted by said loop.

Overall, according to the invention, these arrangements seeking to reduce the electromagnetic field emitted by electronic power equipment, essentially comprise an antenna element placed in the vicinity of a radiating conductor of the equipment so as to absorb the electromagnetic energy reaching it by coupling with the radiating conductor, thereby reducing the energy radiated into the space surrounding both of them.

In the embodiment shown in FIG. 5, where the radiating conductor is a monopole, the antenna element mpa is also a monopole constituted by a conductor having the same length and the same shape as the radiating conductor, and connected to ground at one of its ends.

In the embodiment of FIG. 6, where the radiating conductor is a loop, the antenna element bca is also a loop, formed by a conductor having the same path, the same length, and the same area as the radiating conductor.

The antenna element of FIG. 5, and that of FIG. 6, being electromagnetically coupled to the radiating conductor, whether a monopole or a loop, acts as a dissipative load for the coupled energy, such that the radiation produced in the surrounding space is greatly reduced.

Figure 7:
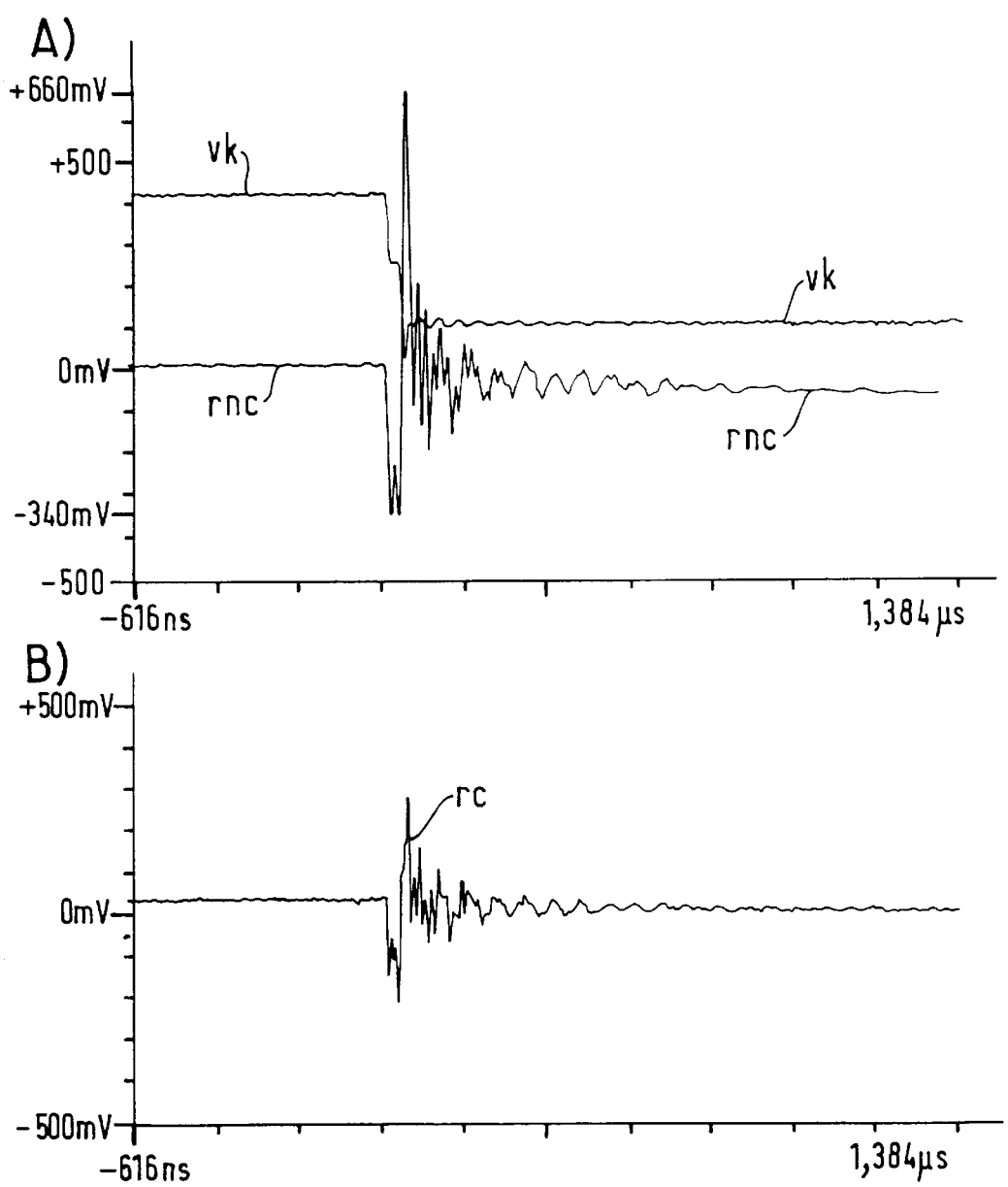
FIG. 7 is a graph showing experimental results for the arrangements of FIG. 5.
Figure 8:
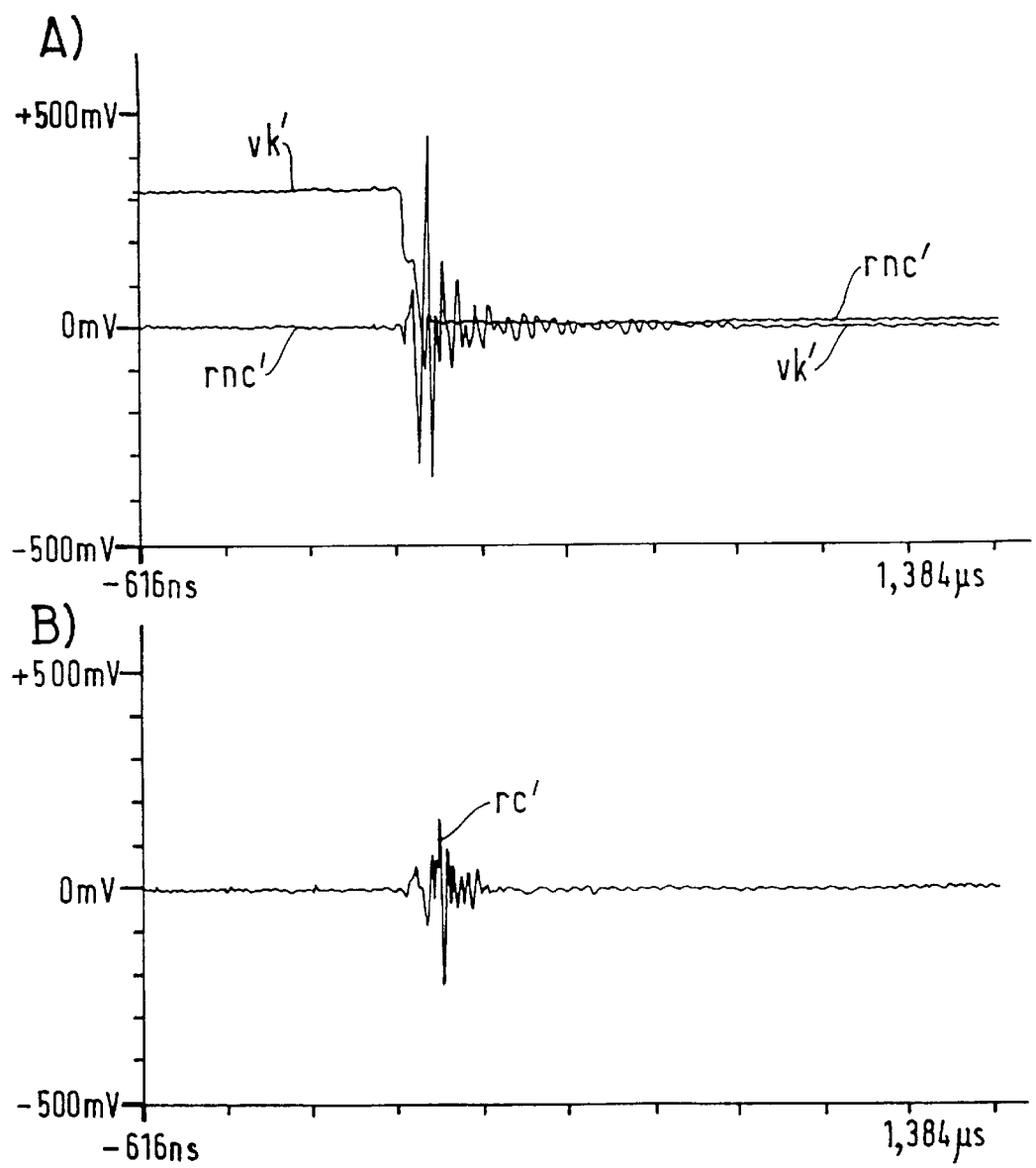
FIG. 8 is a graph showing experimental results for the arrangements of FIG. 6.

FIGS. 7 and 8 shows the advantages provided by the invention in practical cases derived from those shown in FIGS. 5 and 6.

FIG. 7 shows oscilloscope traces observed during testing performed by means of a circuit as shown in FIG. 1, the switching transistor T being of the type known under the reference IGBT, model GW20N50, and capable of switching 500 V and 20 A. The tests whose result is shown were performed at 100 V and 20 A. The load Io had a resistance of 4 ohms and an inductance of 2 mH.

Portion A) of this figure shows a trace vk representing the voltage Vk across the terminals of the switching transistor, and a trace rnc representing the electric field in the absence of the circuit of the invention, whereas in portion B) trace rc was taken under the same conditions but with the antenna element of FIG. 5 in place. It can be seen that the emitted field was reduced by half.

FIG. 8 is similar, but relates to the case shown in FIG. 6, with traces rnc' and rc' corresponding to traces rnc and rc in FIG. 7, and the ratio between them is the same.

We claim:

1. Electronic power equipment with reduced emitted electromagnetic fields comprising:

a ground;

a first conductor connected to said ground; and a second conductor connected to said ground having substantially the same length and same area as said first conductor, wherein said first conductor is a monopole that radiates an electromagnetic field from the operation of said power equipment and said second conductor is a monopole antenna element that dissipates said electromagnetic field radiated by said first conductor.

2. The power equipment of claim 1, wherein said first conductor is a loop and said second conductor is a loop having the same substantially the same path, length, and area as the first conductor.

3. Electronic power equipment with reduced emitted electromagnetic fields comprising:

a ground;

a switch circuit connected to said ground, said switch circuit including a first conductor, said first conductor emitting electromagnetic radiation when subjected to a sudden change in voltage by said switch circuit; and a second conductor of substantially the same length and area provided in proximity to said first conductor connected to said ground, wherein said second conductor is an antenna element that dissipates at least a portion of said electromagnetic radiation emitted by said first conductor.

4. The power equipment of claim 3, wherein said first conductor is a loop and said second conductor is a loop having the same substantially the same path, length, and area as the first conductor.

* * * * *